United States Patent [19]

Koyama et al.

[11] 4,211,684

[45] Jul. 8, 1980

[54] VINYLIDENE CHLORIDE POLYMER LATEX

[75] Inventors: Masaoki Koyama, Yokohama; Hiroyuki Kigo, Nobeoka, both of Japan

[73] Assignee: Asahi-Dow Limited, Tokyo, Japan

[21] Appl. No.: 934,919

[22] Filed: Aug. 18, 1978

[30] Foreign Application Priority Data

1977 [JP] Japan ................................ 52-102623

[51] Int. Cl.² .............................................. C08L 23/14
[52] U.S. Cl. ...................... 260/29.6 TA; 260/29.6 T; 526/273; 526/317; 526/329; 526/342; 526/343
[58] Field of Search ................. 260/29.6 T, 29.6 TA; 526/273, 317, 329, 342, 343

[56] References Cited

U.S. PATENT DOCUMENTS

| | | | |
|---|---|---|---|
| 2,484,760 | 10/1949 | Staudinger | 526/329 |
| 3,671,294 | 6/1972 | Hopermann | 117/76 |

FOREIGN PATENT DOCUMENTS 803613  2/1974  Belgium .

*Primary Examiner*—Paul R. Michl
*Attorney, Agent, or Firm*—T. R. Wills; P. A. Bielinski

[57] ABSTRACT

A latex obtained by emulsion polymerizing (a) 50 to 95 parts by weight of vinylidene chloride; (b) 0.5 to 30 parts by weight of propylene; (c) 4.5 to 20 parts by weight of a comonomer such as methyl acrylate; and, optionally, (d) no more than 5 parts by weight of a polar comonomer such as acrylic acid. Such latices are eminently suited for use as coating compositions due to their superior low temperature heat-sealing properties and decreased blocking tendencies.

3 Claims, No Drawings

VINYLIDENE CHLORIDE POLYMER LATEX

BACKGROUND OF THE INVENTION

The present invention relates to polymer latex coating compositions and, more particularly, to latices of vinylidene chloride polymers.

In recent years, vinylidene chloride polymer latices have been widely used, particularly in the food industry, as coatings for plastic films, cellophane, paper, and like packaging materials due to their high resistance to chemicals and oils, low temperature heat-sealing properties, and excellent resistance to the transmission of oxygen and moisture vapor. However, it has also been recognized that such coatings tend to be generally deficient in a number of properties demanded by advanced packaging techniques. For instance, such coatings should have a lower dynamic coefficient of friction to permit faster packaging speeds. They should also be capable of forming low temperature heat-seals having higher strength to withstand the stresses inherent in such packaging speeds. Further, they should have reduced blocking tendencies to permit rapid feeding from aged rolls of coated packaging material without breaking or destroying the coatings.

Nevertheless, it is generally considered that heat-sealing properties are incompatible with antiblocking and slip properties. Accordingly, the methods chosen to modify such coatings typically have focused on improving only a limited number of properties at one time to the detriment of other properties, thereby inherently restricting the resulting coatings to specific end-uses.

For example, one method consists of increasing the vinylidene chloride content of the latex polymer to improve crystallinity and reduce the tendency for blocking. Due to such increased crystallinity, however, this method undesirably reduces the heat-sealing properties.

Another method employs a suitable amount of an additive, such as talc, wax, silica, or the like, to reduce blocking and increase slip properties. Such additives are typically incompatible with the latices and, accordingly, have a tendency to affect latex stability and reduce the transparency of the resulting coatings.

A further method has consisted of blending a latex having reduced blocking tendencies but poor heat-sealing properties with one or more latices having good heat-sealing properties but high blocking tendencies to achieve a suitable balance in overall performance properties. Although this method has proven to be generally successful in its results, it is nevertheless disadvantageous inasmuch as it necessitates preparing several different but compatible latices and requires careful control of the proportions of each during blending.

Accordingly, it is an object of the present invention to provide a vinylidene chloride polymer latex which can be used to form coatings having improved slip properties and reduced blocking tendencies without sacrificing the low temperature heat-sealing properties.

SUMMARY OF THE INVENTION

The present invention is a polymer latex coating composition comprising the product obtained by emulsion polymerizing a monomer mixture consisting essentially of (a) about 50 to 95 parts by weight of vinylidene chloride; (b) about 0.5 to 30 parts by weight of propylene; (c) about 4.5 to 20 parts by weight of at least one comonomer selected from the group consisting of alkyl esters of acrylic and methacrylic acids, glycidyl esters of acrylic and methacrylic acids, nitriles of ethylenically unsaturated carboxylic acids, vinyl chloride, and styrene; and, optionally, (d) not more than about 5 parts by weight of at least one polar comonomer selected from the group consisting of unsaturated carboxylic acids, unsaturated amides, and hydroxyalkyl esters of unsaturated carboxylic acids.

DETAILED DESCRIPTION OF THE INVENTION

The novel vinylidene chloride polymer latices of the present invention can be prepared by free radical initiated emulsion polymerization processes well known to those skilled in the art.

Suitable emulsifiers which can be employed, either singly or in combination, in the preparation of the present latices include anionic emulsifying agents, such as alkyl aryl sulfonates, alkyl sulfates, alkyl sulfonates, and the like, as well as non-ionic emulsifying agents, such as polyoxyethylene-monofatty acid esters, sorbitan-monofatty acid esters, and the like. Suitable free radical initiating catalysts which can be used include peroxides, such as hydrogen peroxide, tertiary butyl hydroperoxide, and the like; persulfates, such as potassium persulfate, ammonium persulfate, and the like; and redox systems such as an alkali metal bisulfite in combination with a peroxide or persulfate.

In the present invention, if the vinylidene chloride content of the polymer exceeds about 95 parts by weight, the crystallization speed, the film-forming temperature, and heat-sealing temperature will be undesirably increased and, at the same time, the shelf life of the latices is shortened to such an extent that the resultant coated materials cannot be put to practical use. Furthermore, if the vinylidene chloride content goes below about 50 parts by weight, the highly advantageous barrier properties of vinylidene chloride polymers will be diminished. As to propylene, if its content exceeds about 30 parts by weight, the polymerization productivity goes down to a practically unacceptable level due to very poor reactivity between the vinyl comonomers and vinylidene chloride. On the other hand, if the propylene content is reduced below about 0.5 part by weight, the improvement in the antiblocking and slip properties cannot be expected.

The comonomers which are copolymerizable with vinylidene chloride according to the present invention include the alkyl esters of acrylic and methacrylic acids such as methyl acrylate, ethyl acrylate, propyl acrylate, butyl acrylate, octyl acrylate, methyl methacrylate, ethyl methacrylate, propyl methacrylate, butyl methacrylate, octyl methacrylate, and the like; glycidyl esters of acrylic and methacrylic acids such as glycidyl methacrylate; nitriles of ethylenically unsaturated carboxylic acids such as acrylonitrile and methacrylonitrile; and vinyl monomers such as vinyl chloride and styrene.

The polar comonomers which can be used include unsaturated carboxylic acids, e.g., ethylenically unsaturated mono- and dicarboxylic acids such as acrylic acid, methacrylic acid, itaconic acid, fumaric acid, and the like; hydroxyalkyl esters of unsaturated hydrocarbons, e.g., the glycol monoesters of acrylic and methacrylic acids such as hydroxyethyl acrylate, hydroxyethyl methacrylate, hydroxybutyl acrylate, hydroxybutyl methacrylate, and the like; and unsaturated amides, e.g., amides of ethylenically unsaturated carboxylic acids such as acrylamide, crotonamide, and the like.

The resulting latices of the present invention can also contain, if desired, various conventional additives including lubricants, antiblocking agents, and the like.

The latices are coated on a suitable substrate by methods well known in the art. Exemplary substrates include plastic films, such as those prepared from polypropylene, polyamide, and polyester; paper; cellophane; and like packaging materials.

The following specific examples illustrate the invention but are not to be taken as limiting its scope. Parts and percentages are by weight unless otherwise indicated.

The latices used and the performance of film substrates coated therewith were evaluated by the following methods.

COATING METHOD

A urethane anchor agent was first coated by means of a Mayer rod onto a biaxially oriented polypropylene film having the surfaces thereof previously subjected to a corona discharge treatment. The prime-coated film was dried at 105° C. for 15 seconds in a box dryer with internal hot-air circulation. Thereafter, the film was coated with a latex having a solids content of about 40 percent by means of a Mayer rod (at a coating weight of about 3 g/m$^2$) and the resultant coated film was dried at 105° C. for 30 seconds in the box dryer with internal hot-air circulation.

BLOCKING TENDENCY

Specimens taken from the film to be examined were superimposed so as to bring the coated surfaces together and the specimens were placed under a load of 5 kg/cm$^2$ for 24 hours in an atmosphere of 90 percent relative humidity at 40° C. Thereafter, the specimens were pulled apart and the blocking tendency was qualitatively evaluated according to the following scale:

(1) specimens that smoothly separated without any resistance;
(2) specimens that smoothly separated with slight resistance;
(3) specimens that separated with some resistance, but without damaging the coatings;
(4) specimens that had the coatings thereof damaged when separated; or
(5) specimens that would not separate without force and without tearing the substrate.

HEAT-SEALING PROPERTIES

Immediately after coating a film with a latex or after aging the coated film at 40° C. for two days, samples measuring 5 cm×5 cm were cut therefrom and the coated surfaces thereof were heat-sealed for 0.5 second at 80° to 110° C. under a load of 1 kg/cm$^2$ by means of a bar-type heat-sealer. Then, the samples were cut along the direction perpendicular to the heat-sealing surface to obtain three heat-sealing strength test specimens 15 mm wide and 50 mm long each. Thereafter, the specimens were subjected to the measurement of heat-sealing strength at a tension speed of 30 cm/min by using a Tensilon tensile tester. The average heat-sealing strength for the three specimens was recorded.

SLIP PROPERTIES

Using a tack strength tester, dynamic coefficients of friction observable between overlapped film surfaces coated with a latex were measured in an atmosphere of 20° C. and 55 percent relative humidity in accordance with the method of ASTM D-1894-63.

ANTISTATIC PROPERTIES

A rotary static tester developed by the Chemical Research Laboratory of Kyoto University, was used to measure the static voltage generated on a coated film surface rubbed at 400 rpm with a flannel cloth for 40 seconds in an atmosphere of 20° C. and 55 percent relative humidity. The value for antistatic properties was determined relative to the charged voltage on an uncoated specimen.

POLYMER COMPOSITION

In the examples described herein, the polymer composition was determined in the following manner: a sample of the latex was isolated and salted out with methanol and the resultant precipitated resin was analyzed. Vinylidene chloride content was determined by Schöniger's oxygen flask combustion method and methyl acrylate content was determined by means of an infrared spectrophotometer calibrated with a vinylidene chloride-methyl acrylate copolymer having a known composition. The methyl acrylate content was corrected by determining its weight ratio to vinylidene chloride from a standard curve of absorbance ratio and by using the actual vinylidene chloride content obtained from the Schöniger's oxygen flask combustion method. The propylene content was determined by calculation. Acrylic acid content was determined by dissolving 0.5 g of the dried resin in 70 g of dimethylformamide and subjecting the resulting solution to conductimetric titration with a 0.1 N solution of Co(CH$_3$COO)$_2$.

EXAMPLE 1

One hundred parts of deionized water, 3 parts of sodium dodecylbenzenesulfonate, 0.1 part of potassium persulfate, 0.3 part of disodium hydrogen phosphate, and 0.5 part of sodium sulfate were placed in a stainless steel autoclave provided with an agitator. Subsequently, the air contained in the autoclave was fully substituted with nitrogen gas and the autoclave was closed. Then, the internal temperature of the autoclave was raised while agitating the contents therein. When the internal temperature reached 30° C., the internal pressure of the autoclave was reduced to 160 mm Hg. Thereafter, 78 parts of vinylidene chloride (VDC), 5 parts of methyl acrylate (MA), and 17 parts of propylene (P) were further charged in the autoclave and mixed therein for 30 minutes. Then, the internal temperature was further raised to 50° C. and the mixture was allowed to polymerize for 20 hours. At the end of that period, the internal temperature of the autoclave was cooled to 25° C. and the residual unreacted monomers were slowly vented. Sodium dodecylbenzenesulfonate was added to the resultant latex to adjust its surface tension to 40 dyne/cm. This latex was designated as Latex A.

For comparison, 90 parts of vinylidene chloride and 10 parts of methyl acrylate were polymerized in the same manner as used for the Latex A. To the resultant latex, sodium dodecylbenzenesulfonate was added to adjust its surface tension to 40 dyne/cm. This latex was designated as Latex B.

Varying amounts of a carnauba wax emulsion and a silica lubricant were added to some samples of the A and B latices.

The so-formed latices were coated on biaxially oriented polypropylene films in the manner earlier described and the resultant films, all of which were haze-free, were tested for physical properties. The results of these tests are reported in Table I.

TABLE I

| Latex | Polymer Composition | | | Additives[1] | Blocking Tendency | Heat-Sealing Properties (g/15 mm) | | | Slip Properties (μk) | Antistatic Properties |
|---|---|---|---|---|---|---|---|---|---|---|
| | VDC | P | MA | | | 80° C. | 90° C. | 110° C. | | |
| The Invention | | | | | | | | | | |
| A | 90 | 4 | 6 | Nil | 3 | 20 | 100 | 110 | 0.25 | 0.1 |
| | | | | Lubricant 0.2 | 1 | 15 | 110 | 110 | 0.22 | 0.1 |
| | | | | Wax 0 | | | | | | |
| | | | | Lubricant 0.2 | 1 | 0 | 45 | 90 | 0.20 | 0.1 |
| | | | | Wax 0.5 | | | | | | |
| For Comparison | | | | | | | | | | |
| B | 90 | 0 | 10 | Nil | 5 | 0 | 20 | 90 | 0.35 | 1 |
| | | | | Lubricant 0.2 | 3 | 0 | 0 | 40 | 0.31 | 1 |
| | | | | Wax 1.0 | | | | | | |

Note:
[1] Percent by weight of latex solids.

As clearly seen from Table I, the latices which include propylene provide coatings having improved antistatic and slip properties in addition to good heat-sealing properties at lower temperatures and reduced blocking tendency.

EXAMPLE 2

In the manner of Example 1, Latices C, D, E, and F were prepared by using varied proportions of charged monomers. Each of the resultant latices were mixed with 1 percent, based on the weight of latex solids, of a carnauba wax emulsion and 0.2 percent, based on the weight of latex solids, of silica lubricant. The treated latices were then coated on biaxially oriented polypropylene films and physical properties of the resultant coated films, all of which were haze-free, were measured. The results of these tests are shown in Table II.

TABLE II

| Latex | Charged Monomers (parts by weight) | | | | Polymer Composition (% by weight) | | | | Blocking Tendency | Heat-Sealing Properties (g/15 mm) | | | Slip Properties (μk) | Antistatic Properties |
|---|---|---|---|---|---|---|---|---|---|---|---|---|---|---|
| | VDC | P | MA | AA[1] | VDC | P | MA | AA[1] | | 80° C. | 90° C. | 110° C. | | |
| The Invention | | | | | | | | | | | | | | |
| C | 82 | 13 | 5 | 0 | 92 | 3 | 5 | 0 | 1 | 0 | 0 | 50 | 0.22 | <0.1 |
| D | 77 | 17 | 4.5 | 1.5 | 90 | 4 | 5 | 1.2 | 2 | 25 | 60 | 95 | 0.25 | 0.5 |
| For Comparison | | | | | | | | | | | | | | |
| E | 92 | 0 | 8 | 0 | 92 | 0 | 8 | 0 | 2 | 0 | 0 | 0 | 0.30 | 1 |
| F | 90 | 0 | 9 | 1.5 | 90 | 0 | 9 | 1.2 | 3 | 0 | 20 | 80 | 0.32 | 1 |

Note:
[1] acrylic acid

The results shown in Table II again highlight the improved properties of coatings prepared from latices of the present invention. These results also demonstrate the enhanced heat-sealing properties obtained when the present latices include a minor amount of a polar comonomer such as acrylic acid.

What is claimed is:

1. An aqueous polymer latex coating composition comprising the product obtained by emulsion polymerizing a monomer mixture consisting essentially of
   (a) about 50 to 95 parts by weight of vinylidene chloride;
   (b) about 0.5 to 30 parts by weight of propylene;
   (c) about 4.5 to 20 parts by weight of at least one comonomer selected from the group consisting of alkyl esters of acrylic and methacrylic acids, glycidyl esters of acrylic and methacrylic acids, nitriles of ethylenically unsaturated carboxylic acids, vinyl chloride, and styrene; and, optionally,
   (d) not more than about 5 parts by weight of at least one polar comonomer selected from the group consisting of unsaturated carboxylic acids, unsaturated amides, and hydroxyalkyl esters of unsaturated carboxylic acids.

2. A latex coating composition according to claim 1 wherein the monomeric mixture consists essentially of
   (a) about 77 to 82 parts by weight of vinylidene chloride;
   (b) about 13 to 17 parts by weight of propylene;
   (c) about 4.5 to 5 parts by weight of methyl acrylate; and
   (d) less than about 2 parts by weight of acrylic acid.

3. A process for coating surfaces of manufactured articles which comprises coating at least one surface of a substrate with a latex coating composition as described in claims 1 or 2.

* * * * *